(12) United States Patent
Hisano et al.

(10) Patent No.: US 6,603,805 B1
(45) Date of Patent: Aug. 5, 2003

(54) TRANSCEIVER CIRCUIT TRANSMITTING/RECEIVING A TENARY PULSE SIGNAL (75) Inventors: Ryuji Hisano, Tokyo (JP); Hiroyuki Kanbara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/534,635

(22) Filed: Mar. 27, 2000

(30) Foreign Application Priority Data

Jun. 29, 1999 (JP) .......................................... 11-183200

(51) Int. Cl.⁷ ................................................ H04B 1/38
(52) U.S. Cl. .......................... 375/219; 375/258; 455/73
(58) Field of Search ................................ 375/219, 220, 375/257, 258; 455/73

(56) References Cited

U.S. PATENT DOCUMENTS 6,466,613 B1 * 10/2002 Raphaeli et al. ............ 375/219

FOREIGN PATENT DOCUMENTS

JP          10374502       * 7/2000

* cited by examiner

Primary Examiner—Temesghen Ghebretinsae
(74) Attorney, Agent, or Firm—Rabin & Berdo, P.C.

(57) ABSTRACT

A half-matching type transceiver circuit which only requires a reduced area for mounting. A coupling transformer has a primary winding with one end and the other end connected to balanced transmission lines, and a secondary winding with one end and the other end connected to output terminals of first and second tristate buffers, respectively. These tristate buffers are supplied at their respective input terminals with a high potential driving pulse signal corresponding to information data at shifted timings to generate a ternary transmission pulse signal on the balanced transmission lines.

6 Claims, 6 Drawing Sheets

TRANSCEIVER CIRCUIT TRANSMITTING/RECEIVING A TENARY PULSE SIGNAL

BACKGROUND OF THE INVENTION

1. Field of the Invention

The present invention relates to a transceiver circuit for use in a communication system which communicates data through a wired transmission line.

2. Description of the Related Art

With recent advancement of digitization in information communication networks, the operation of ISDN (Integrated Services Digital Network) has been inaugurated in order to provide integration of a variety of services.

Figure 1:
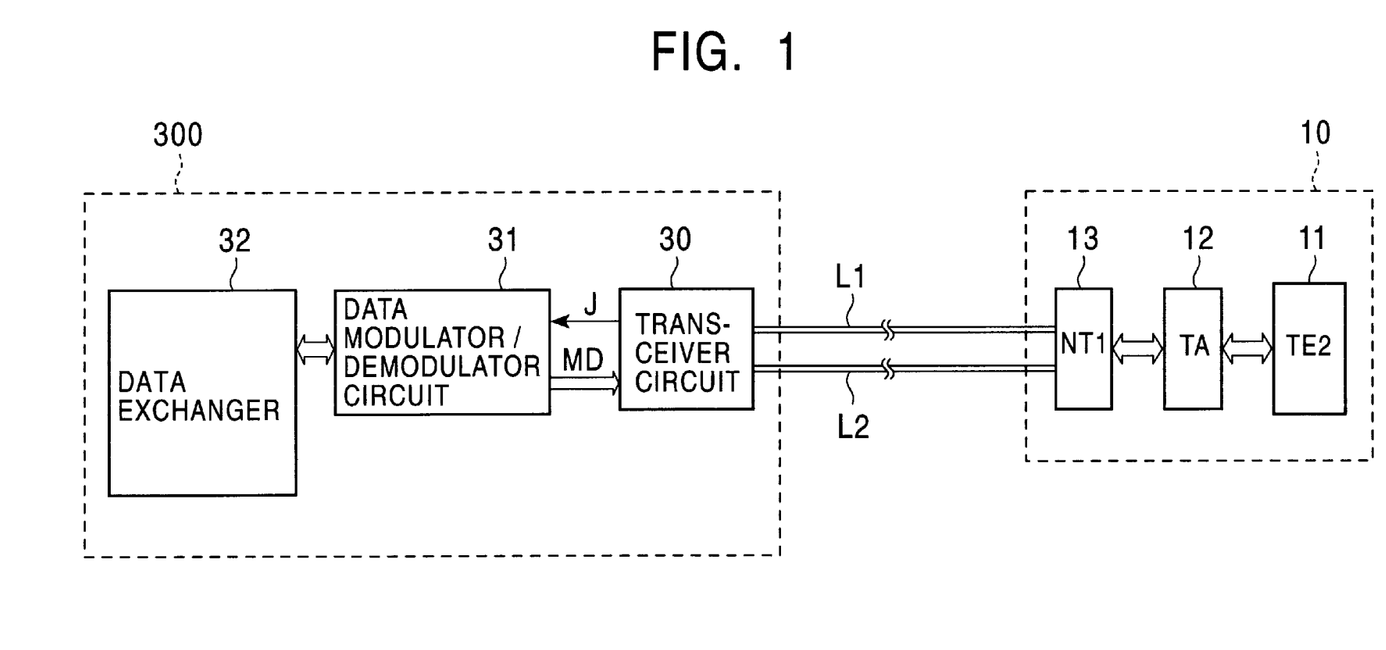
FIG. 1 is a block diagram illustrating a form of an ISDN-based communication system.

FIG. 1 illustrates a form of such an ISDN-based communication system.

It should be noted that while FIG. 1 illustrates an ISDN station 300 for centrally governing the communication system, and only one terminal 10 as an ISDN subscriber's terminal, a number of terminals 10 corresponding to the number of subscribers are actually connected to the single ISDN station 300.

The terminal 10 comprises an ISDN non-standard terminal device 1 as a so-called TE2, which may include, for example, a telephone, a facsimile, a personal computer or the like; a terminal adaptor (TA) 12 for converting an interface; and a network termination device 13 as NT1. The ISDN station 300, on the other hand, comprises a transceiver circuit 300; a data modulator/demodulator circuit 31; and a data exchanger 32.

For communicating desired information data from the terminal 10 to another terminal 10, the ISDN non-standard terminal device 11 first supplies the network termination device 13 with the information data and a destination signal indicative of a circuit of a destination through the TA 12. The network termination device 13 applies a predetermined modulation to the information data and destination signal, converts the modulated information data and destination signal to a ternary pulse signal for balanced transmission, and sends the ternary pulse signal onto balanced transmission lines L1, L2 comprised of two lines.

The transceiver circuit 30 of the ISDN station 300 receives the ternary pulse signal transmitted thereto through the balanced transmission lines L1, L2, and supplies the received signal J to the data modulator/demodulator circuit 31. The data modulator/demodulator circuit 31 applies predetermined demodulation processing to the received signal J to recover the original information data and destination signal which are then supplied to the data exchanger 32. A system composed of these balanced transmission lines L1, L2, transceiver circuit 30 and data modulator/demodulator circuit 31 defines one circuit. In other words, the ISDN station 300 is provided with a number of the transceiver circuits 30 and the data modulator/demodulator circuits 31 equal to the number of circuits possessed thereby.

The data exchanger 32 of the ISDN 300 supplies the information data only to a particular data modulator/demodulator circuit 31 associated with a circuit indicated by the destination signal supplied from the data modulator/demodulator circuit 31 so as to establish a communication through the circuit. The data modulator/demodulator circuit 31, upon receiving the information data, applies predetermined modulation processing to the information data to produce modulated information data MD which is then supplied to the transceiver circuit 30. The transceiver circuit 30 converts the modulated information data MD to a ternary signal for balanced transmission, and transmits the ternary signal to a desired destination through the balanced transmission lines L1, L2.

In a conventional transceiver circuit as mentioned above, relatively large discrete devices having a high current supply capability must be employed for transistors connected to a winding for transmission because of the need for transmitting pulse signals, which carry information data, through balanced transmission lines to a terminal located at a relatively remote site. The employment of larger transistors in the transceiver circuit results in a problem that a correspondingly larger area is required for mounting the transceiver circuit itself.

OBJECT AND SUMMARY OF THE INVENTION

The present invention has been made to solve the problem mentioned above, and an object the invention is to provide a half-matching type transceiver circuit which requires a smaller mounting area.

The present invention provides a transceiver circuit for transmitting or receiving a ternary pulse signal carrying information data through two balanced transmission lines, comprising: a coupling transformer having a primary winding with one end and the other end thereof connected to the balanced transmission lines; a first tristate buffer having an output terminal thereof connected to one end of a secondary winding of the coupling transformer; a second tristate buffer having an output terminal thereof connected to the other end of the secondary winding of the coupling transformer; and a transmission/reception driving control circuit responsive to the information data to be transmitted for intermittently generating a first driving pulse signal having a predetermined high potential to supply the first driving pulse signal to an input terminal of the first tristate buffer, while intermittently generating a second driving pulse signal having the high potential at a timing different from the first driving pulse signal to supply the second driving pulse signal to an input terminal of the second tristate buffer, and further for controlling the first tristate buffer and the second tristate buffer such that the first tristate buffer and the second tristate buffer are enabled only at a timing at which the first driving pulse signal or the second driving pulse signal is generated.

In the present invention, the coupling transformer has the primary winding with one end and the other end connected to balanced transmission lines, and the secondary winding with one end and the other end connected to the output terminals of the first and second tristate buffers, respectively. These tristate buffers are supplied at their respective input terminals with a high potential driving pulse signal corresponding to information data to generate a ternary transmission pulse signal on the balanced transmission lines. Thus, since a half-matching type transceiver circuit can be realized without employing discrete parts, an area required for mounting the transceiver circuit can be reduced.

DETAILED DESCRIPTION OF PREFERRED EMBODIMENTS

Prior to a detailed description on embodiments of the present invention, the transceiver circuit 30 illustrated in FIG. 1 will be described in detail with reference to associated accompanying drawings.

Figure 2:
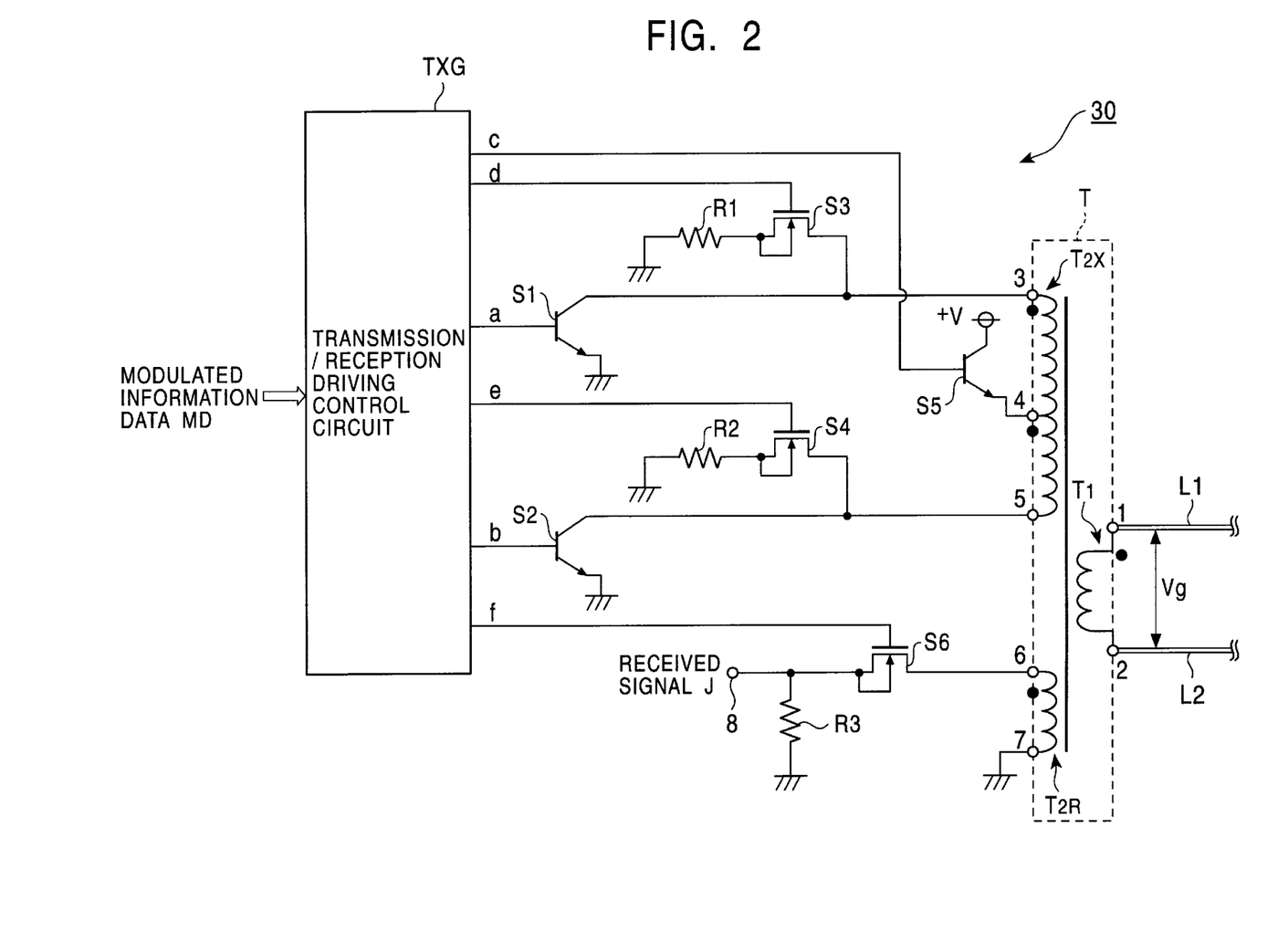
FIG. 2 is a schematic diagram illustrating the internal configuration of a conventional transceiver circuit 30.

FIG. 2 is a schematic diagram illustrating the internal configuration of the transceiver circuit 30.

Referring specifically to FIG. 2, a coupling transformer T has a primary winding $T_1$, a secondary winding $T_{2X}$ for transmission, and a secondary winding $T_{2R}$ for reception. Terminals 1, 2 of the primary winding $T_1$ are connected to balanced transmission lines L1, L2, respectively.

The secondary winding $T_{2X}$ for transmission of the coupling transformer T has a terminal 3 grounded through a transistor S1 and also grounded through a transistor S3 and a resistor R1. In this event, the transistor S1 is controlled ON/OFF in response to a driving signal a supplied from a transmission/reception driving control circuit TXG. The transistor S3 in turn is controlled ON/OFF in response to a driving signal d supplied from the transmission/reception driving control circuit TXG. Also, the secondary winding $T_{2X}$ for transmission has a terminal 4 connected to a power supply potential +V through a transistor S5. In this event, the transistor S5 is controlled ON/OFF in response to a driving signal c supplied from the transmission/reception driving control circuit TXG. Further, the secondary winding $T_{2X}$ for transmission has a terminal 5 grounded through the transistor S2 and also grounded through a transistor S4 and a resistor R2. In this event, the transistor S2 is controlled ON/OFF in response to a driving signal b supplied from the transmission/reception driving control circuit TXG. The transistor S4 in turn is controlled ON/OFF in response to a driving signal e supplied from the transmission/reception driving control circuit TXG.

Also, the secondary winding $T_{2R}$ for reception in the coupling transformer T has a terminal 7 grounded, and a terminal 6 connected to a reception terminal 8 through a transistor S6. The reception terminal 8 is grounded through a resistor R3. The transistor S6 is controlled ON/OFF in response to a driving signal f supplied from the transmission/reception driving control circuit TXG. The transistor S6 connects the terminal 6 of the secondary winding $T_{2R}$ for reception to the reception terminal 8, only when it is in ON state, to transmit a received signal J to the reception terminal 8.

Figure 3:
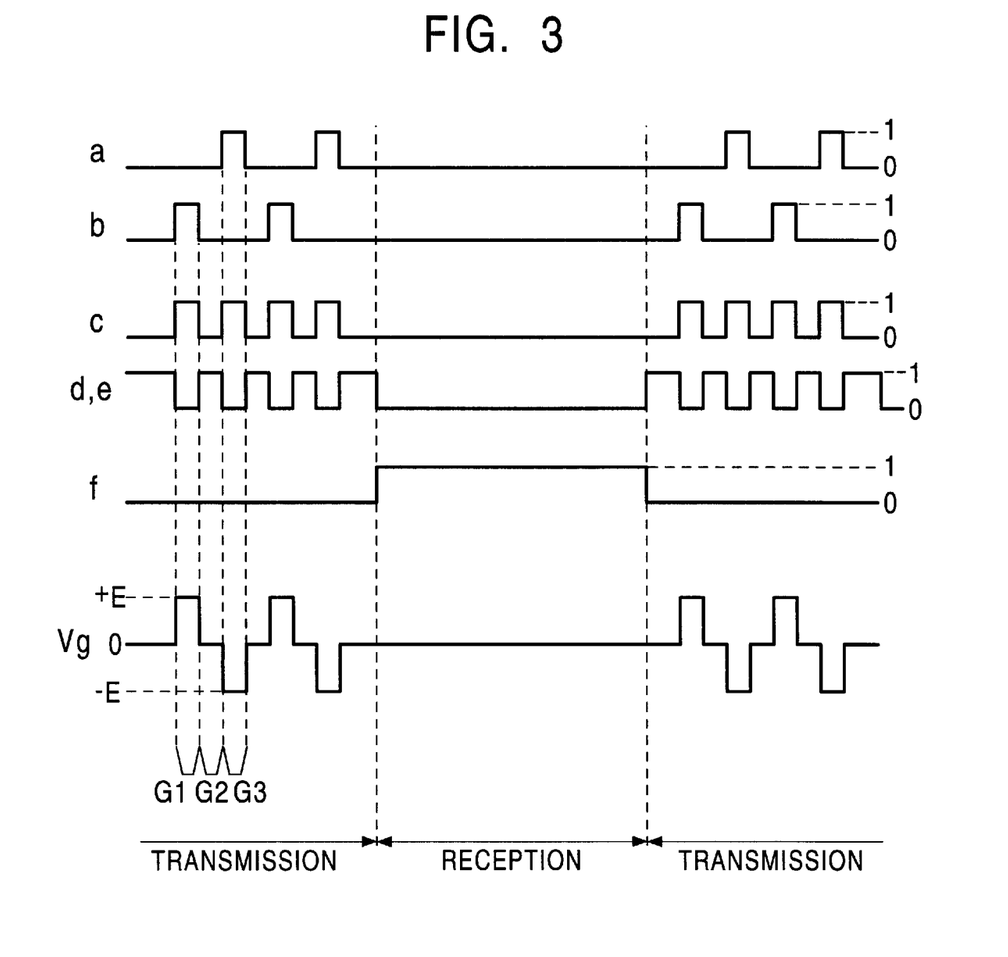
FIG. 3 is a waveform diagram illustrating the operation performed by the transceiver circuit 30.

The transmission/reception control circuit TXG generates the driving signal f which is at logical level "0" when the transceiver circuit 30 is in a transmission operation and at logical level "1" when it is in a reception operation, as illustrated in FIG. 3, and supplies the driving signal f to the transistor S6.

The transistor S6 is in ON state when the driving signal f is at logical level "1," i.e., when the transceiver circuit 30 is performing a reception operation, to transmit, to the reception terminal 8, the received signal J which has been received through the balanced transmission lines L1, L2 and the secondary winding $T_{2R}$ for reception of the coupling transformer T. In this event, the source terminal 10 is of course in transmission state, and the characteristic impedance of the transmission path is equal to its terminal impedance.

On the other hand, when the transceiver circuit 30 is performing a transmission operation, the transmission/reception driving control circuit TXG generates the driving signals a–e composed of pulse trains as illustrated in FIG. 3 based on modulated information data MD supplied from the data modulator/demodulator circuit 31, and supplies these driving signals to the associated transistors S1–S5, respectively. These transistors S1–S5 turn OFF when the respective driving signals are at logical level "0" and turn ON when at logical level "1."

Thus, in a first driving interval G1 illustrated in FIG. 3, the transistors S2, S5 turn ON, while the transistors S1, S3, S4 turn OFF. This allows a current to flow a path including the transistor S5, the terminal 4 of the secondary winding $T_{2X}$ for transmission, the terminal 5 and the transistor S2. In response, a current also flows through the primary winding $T_1$ of the coupling transformer T, resulting in an interline voltage Vg having a voltage +E, as illustrated in FIG. 3, generated between the balanced transmission lines L1, L2. Also, in this event, since a low impedance with a power supply potential +V is connected to the primary winding $T_1$ of the coupling transformer T, an extremely low output impedance appears between the balanced transmission lines L1, L2.

In the next second driving interval G2, the transistors S1, S2, S5 turn OFF, while the transistors S3, S4 turn ON. This results in an interline voltage Vg having a voltage equal to zero, as illustrated in FIG. 3, generated between the balanced transmission lines L1, L2. Also, in this event, the resistors R1, R2 are connected in series with the secondary winding $T_{2X}$ for transmission of the coupling transformer T. Since the resistance of the serially connected resistors R1, R2 is set at a value which matches the characteristic impedance of the transmission path, a significant reduction is accomplished in the influence due to reflection or the like.

In the next third driving interval G3, the transistors S1, S5 turn ON, while the transistors S2, S3, S4 turn OFF. This causes a current to flow a path including the transistor S5, the terminal 4 of the secondary winding $T_{2X}$ for transmission, the terminal 3, and the transistor S1. In response, a current flows through the primary winding $T_1$ of the coupling transformer T in the direction reverse to that during the aforementioned first driving interval G1, resulting in a interline voltage Vg having a voltage –E, as illustrated in FIG. 3, generated between the balanced transmission lines L1, L2.

Thus, according to the operations from the first driving interval G1 to the third driving interval G3, a ternary pulse signal having the voltages +E, 0, –E corresponding to information data is delivered onto the balanced transmission lines L1, L2.

In this event, when the transceiver circuit 30 is transmitting a pulse signal having an amplitude such as the voltage +E or the voltage –E, the output impedance becomes sufficiently lower than the characteristic impedance of the transmission path, so that a transmission loss of the current is suppressed, thereby making it possible to accomplish a transmission with a signal amplitude large enough to be immune to noise. Also, when the transceiver circuit 30 is transmitting a signal having no amplitude such as the voltage 0, the output impedance matches the characteristic impedance of the transmission path, so that the transceiver circuit 30 is advantageously less susceptible to the influence such as reflection or the like. In other words, the transceiver circuit 30 is a so-called half-matching transceiver circuit which functions as an impedance-unmatching type transceiver when it is transmitting a pulse signal having an amplitude such as the voltage +E or the voltage −E, and functions as an impedance-matching type transceiver when it is transmitting a signal having no amplitude such as the voltage 0, thus having the characteristics of both the types.

Here, the transceiver circuit 30 illustrated in FIG. 2 must transmit pulse signals carrying information data to a terminal 10 located at a relatively remote site through the balanced transmission lines L1, L2. Thus, the transistors S1, S2 must be implemented by relatively large discrete devices having high current supply capabilities.

As mentioned above, the employment of the larger transistors S1, S2 results in a problem that a correspondingly larger area is required for mounting the transceiver circuit 30 itself.

In the following, embodiments of the present invention will be described in detail.

Figure 4:
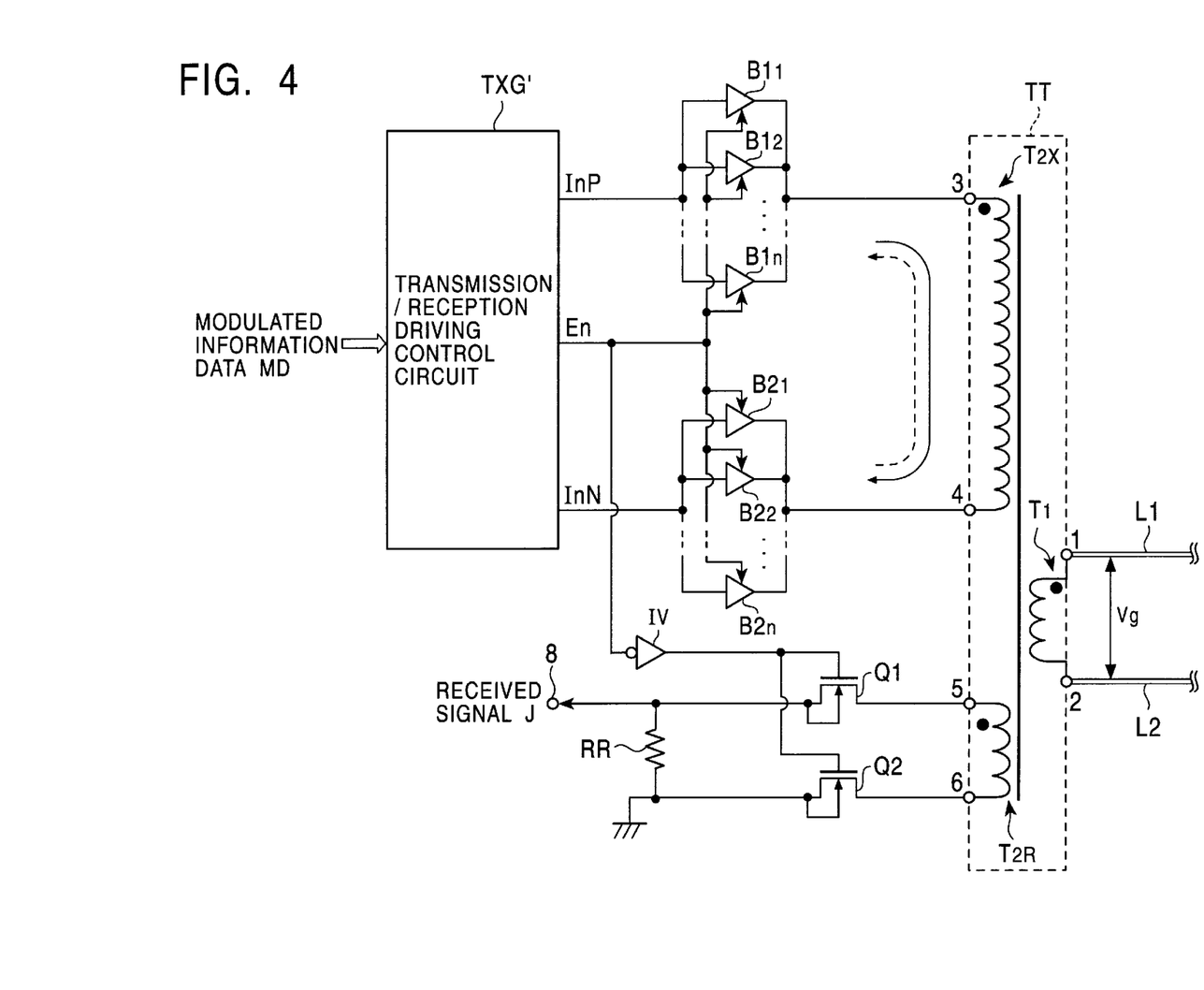
FIG. 4 is a schematic diagram illustrating the internal configuration of a transceiver circuit according to the present invention.

FIG. 4 is a schematic diagram illustrating the configuration of a transceiver circuit according to the present invention.

Referring specifically to FIG. 4, a coupling transformer TT has a primary winding $T_1$, a secondary winding $T_{2X}$ for transmission, and a secondary winding $T_{2R}$ for reception. The primary winding $T_1$ has terminals 1, 2 connected to balanced transmission lines L1, L2, respectively. The balanced transmission lines L1, L2 are connected to a terminal 10 having an ISDN non-standard terminal device 11, a TA 12, and a network termination device 13, as illustrated in FIG. 1.

The secondary winding $T_{2X}$ for transmission in the coupling transformer TT has a terminal 3 connected to output terminals of n tristate buffers $B1_1$–$B1_n$. Each of the tristate buffers $B1_1$–$B1_n$ is supplied at its input terminal with a first driving pulse signal InP from a transmission/reception driving control circuit TXG'. In other words, the respective tristate buffers $B1_1$–$B1_n$ have their input terminals connected to one another and their output terminals also connected to one another. The secondary winding $T_{2X}$ for transmission has a terminal 4 connected to output terminals of n tristate buffers $B2_1$–$B2_n$. Each of the tristate buffers $B2_1$–$B2_n$ is supplied at its input terminal with a second driving pulse signal InN from the transmission/reception driving control circuit TXG'. In other words, the tristate buffers $B2_1$–$B2_n$ have their input terminals connected to one another and their output terminals also connected to one another. It should be noted that the number n of the connected tristate buffers B1 (or B2) is predetermined in accordance with the amount of current required to drive the balanced transmission lines L1, L2.

Each of the tristate buffers $B1_1$–$B1_n$ and $B2_1$–$B2_n$ is commonly supplied at its enable terminal with a transmission/reception control signal En from the transmission/reception driving control circuit TXG'. More specifically, each of the tristate buffers $B1_1$–$B1_n$ and $B2_1$–$B2_n$ is disabled when it is supplied at its enable terminal with the transmission/reception control signal En at logical level "0" so that each output terminal presents a high impedance state. On the other hand, each of the tristate buffers $B1_1$–$B1_n$ and $B2_1$–$B2_n$ is enabled to output when it is supplied with the transmission/reception control signal En at logical level "1," and generates a potential at its output terminal corresponding to a logical level of the first driving pulse signal InP (or InN) supplied to its input terminal (for example, a low potential with the logical level "0" and a high potential with the logical level "1"). Each of the tristate buffers $B1_1$–$B1_n$ and $B2_1$–$B2_n$ is formed in a MOS (Metal Oxide Semiconductor) structure.

The secondary winding $T_{2R}$ for reception in the coupling transformer TT has a terminal 5 connected to a drain terminal of an n-channel MOS transistor Q1 which serves as a switching element. The transistor Q1 has a source terminal connected to a reception terminal 8. The reception terminal 8 is grounded through a resistor RR so that a voltage generated at the reception terminal 8 is output as a received signal J. The resistor RR has a resistance which matches the characteristic impedance of a transmission path.

The secondary winding $T_{2R}$ for reception in the coupling transformer TT has a terminal 6 connected to a drain terminal of an n-channel MOS transistor Q2 which serves as a switching element. The transistor Q2 has a grounded source terminal. These transistors Q1, Q2 are supplied at their respective gate terminals with the transmission/reception control signal En after it has been inverted its logical level through an invertor IV. In other words, each of the transistors Q1, Q2 turns OFF when the transmission/reception control signal En is at logical level "1," and turns ON when the transmission/reception control signal En is at logical level "0." When the transistors Q1, Q2 each turn ON, a potential generated at the terminal 5 of the secondary winding $T_{2R}$ for reception is output as a received signal J from the reception terminal 8, and the resistor RR is connected between the terminals 5, 6 of the secondary winding $T_{2R}$ for reception.

Figure 5:
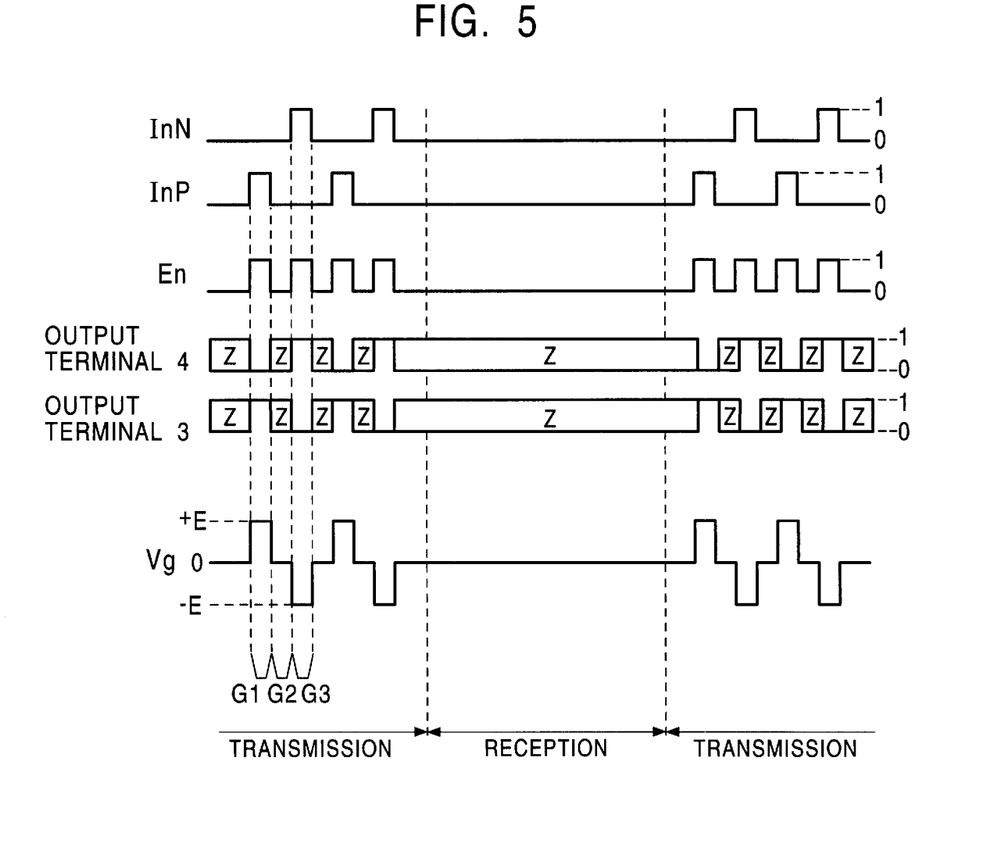
FIG. 5 is a waveform diagram illustrating the operation performed by the transceiver circuit according to the present invention.

The transmission/reception driving control circuit TXG' generates the aforementioned first driving pulse signal InP, second driving pulse signal InN and transmission/reception control signal En having pulse trains as illustrated in FIG. 5, based on modulated information data MD supplied from the data modulator/demodulator circuit 31 illustrated in FIG. 1.

In the following, the operation of the transceiver circuit illustrated in FIG. 4 will be described with reference to FIG. 5.

The illustrated transceiver circuit executes a first driving interval G1, a second driving interval G2 and a third driving interval G3, as illustrated in FIG. 5, in its transmission operation.

First, in the first driving interval G1, the transmission/reception driving control circuit TXG' generates each of the first driving pulse signal Inp at logical level "1," the second driving pulse signal InN at logical level "0," and the transmission/reception control signal En at logical level "1," as illustrated in FIG. 5. Each of the tristate buffers $B1_1$–$B1_n$ and $B2_1$–$B2_n$ is enabled to output in response to these signals, and generates a potential corresponding to the logical level of the first or second driving pulse signal InP, InN supplied to its input terminal, respectively, and applies the generated potential to the terminal 3 or 4 of the secondary winding $T_{2X}$ for transmission of the coupling transformer TT. Specifically, each of the tristate buffers $B1_1$–$B1_n$ applies the terminal 3 of the secondary winding $T_{2X}$ for transmission with a high potential corresponding to the logical level "1" as illustrated in FIG. 5, while each of the tristate buffers $B2_1$–$B2_n$ applies the terminal 4 of the secondary winding $T_{2X}$ for transmission with a low potential corresponding to the logical level "0" as illustrated in FIG. 5. This causes a current to flow in a direction indicated by a solid-line arrow in FIG. 4 in a path including the tristate buffers $B1_1$–$B1_n$, terminals 3, 4 of the secondary winding $T_{2X}$ for transmission, and tristate buffers $B2_1$–$B2_n$. In this event, the amount of current flowing through the path is the sum of currents output from the respective tristate buffers $B1_1$–$B1_n$. The current flowing between the terminals 3, 4 of the secondary winding $T_{2X}$ for transmission causes a corresponding current to flow through the primary winding $T_1$ of the coupling transformer TT, resulting in an interline voltage Vg having a positive voltage +E, as illustrated in FIG. 5, generated between the terminals 1, 2 of the primary winding $T_1$.

Next, in the second driving interval G2 illustrated in FIG. 5, the transmission/reception driving control circuit TXG' brings each of the first driving pulse InP, the second driving pulse signal InN, and the transmission/reception control signal En to logical level "0." In response, each of the tristate buffers $B1_1$–$B1_n$ and $B2_1$–$B2_n$ is disabled. This result in a high impedance state at each of the terminals 3, 4 of the secondary winding $T_{2X}$ for transmission of the coupling transformer TT, so that the interline voltage Vg across the primary winding $T_1$ of the coupling transformer TT becomes zero as illustrated in FIG. 5. Further, in the second driving interval G2, since the transmission/reception control signal En is at logical level "0," each of the transistors Q1, Q2 turns ON so that the resistor RR is connected between the terminals 5, 6 of the secondary winding $T_{2R}$ for reception. In this event, since the resistor RR has a resistance set at a value which matches the characteristic impedance of a transmission path, a significant reduction is accomplished in the influence due to reflection or the like.

Next, in the third driving interval G3, the transmission/reception driving control circuit TXG' generates the first driving pulse signal InP at logical level "0," the second driving pulse signal InN at logical level "1," and the transmission/reception control signal En at logical level "1" as illustrated in FIG. 5. Each of the tristate buffers $B1_1$–$B1_n$ and $B2_1$–$B2_n$ is enabled to output in response to these signals, and generates a potential corresponding to the logical level of the first or second driving pulse signal InP, InN supplied to its input terminal, respectively, and applies the generated potential to the terminal 3 or 4 of the secondary winding $T_{2X}$ for transmission of the coupling transformer TT. Specifically, each of the tristate buffers $B1_1$–$B1_n$ applies the terminal 3 of the secondary winding $T_{2X}$ for transmission with a low potential corresponding to the logical level "0" as illustrated in FIG. 5, while each of the tristate buffers $B2_1$–$B2_n$ applies the terminal 4 of the secondary winding $T_{2X}$ for transmission with a high potential corresponding to the logical level "1" as illustrated in FIG. 5. This causes a current to flow in a path including the tristate buffers $B2_1$–$B2_n$, terminals 4, 3 of the secondary winding $T_{2X}$ for transmission, and tristate buffers $B1_1$–$B1_n$ in a direction as indicated by a broken-line arrow in FIG. 4. In this event, the amount of current flowing through the path is the sum of currents output from the respective tristate buffers $B2_1$–$B2_n$. The current flowing between the terminals 3, 4 of the secondary winding $T_{2X}$ for transmission in the direction opposite to that in the first driving interval results in an interline voltage Vg having a negative voltage –E, as illustrated in FIG. 5, generated between the terminals 1, 2 of the primary winding $T_1$ of the coupling transformer TT.

Thus, according to the operation in the fist driving interval G1 to the third driving interval G3, a ternary transmission pulse signal at the voltages +E, 0, –E, corresponding to information data is delivered onto the balanced transmission lines L1, L2.

During a reception operation, on the other hand, the transmission/reception driving control circuit TXG' brings all of the first driving pulse signal InP, the second driving pulse signal InN, and the transmission/reception control signal En to logical level "0" as illustrated in FIG. 5 in a manner similar to the foregoing second driving interval G2. In response, each of the tristate buffers $B1_1$–$B1_n$ and $B2_1$–$B2_n$ is disabled, resulting in a high impedance state at each of the terminals 3, 4 of the secondary winding $T_{2X}$ for transmission of the coupling transformer TT. Thus, at the terminal 5 of the secondary winding $T_{2R}$ for reception of the coupling transformer TT, a potential is generated corresponding to the ternary pulse signal transmitted thereto from the terminal 10 through the balanced transmission lines L1, L2. Here, since each of the transistors Q1, Q2 turns ON in response to the transmission/reception control signal En at logical level "0" as described above, a signal corresponding to the varying potential generated at the terminal 5 of the secondary winding $T_{2R}$ for reception is outputted to the reception terminal 8 as a received signal J. In this event, since the resistor RR having the resistance matching the characteristic impedance of the transmission path is connected between the terminals 5, 6 of the secondary winding $T_{2R}$ for reception, a significant reduction is accomplished in the influence due to reflection or the like.

In the present invention as described above, the terminals 3, 4 of the secondary winding $T_{2X}$ for transmission of the coupling transformer TT are connected to output terminals of the first tristate buffers B1 and the second tristate buffers B2, respectively, to realize a half-matching type transceiver circuit.

Here, the amount of current required to drive the balanced transmission lines L1, L2 is produced by a number n of the tristate buffers B1 (or B2) connected in parallel, as illustrated in FIG. 1. Specifically, assuming that one tristate buffer can generate a maximum output current i, if the amount of current five times as much as the current i is required to drive the balanced transmission lines L1, L2, the number n is "5." In other words, five tristate buffers are employed, and their input terminals are connected to one another, while their output terminals are also connected to one another.

In this event, the tristate buffers may be implemented by those formed as cells in a MOS structure LSI.

It is therefore possible to realize a half-matching type transceiver circuit having a desired current driving capability without the need for employing relatively large discrete parts (transistors S1, S2), and accordingly reduce an area required to mount the transceiver circuit itself.

While the foregoing embodiment employs a transformer having two secondary windings, i.e., the secondary winding $T_{2X}$ for transmission and the secondary winding $T_{2R}$ for reception, as the coupling transformer TT, the secondary windings may be combined into one which can be commonly used for transmission and reception.

Figure 6:
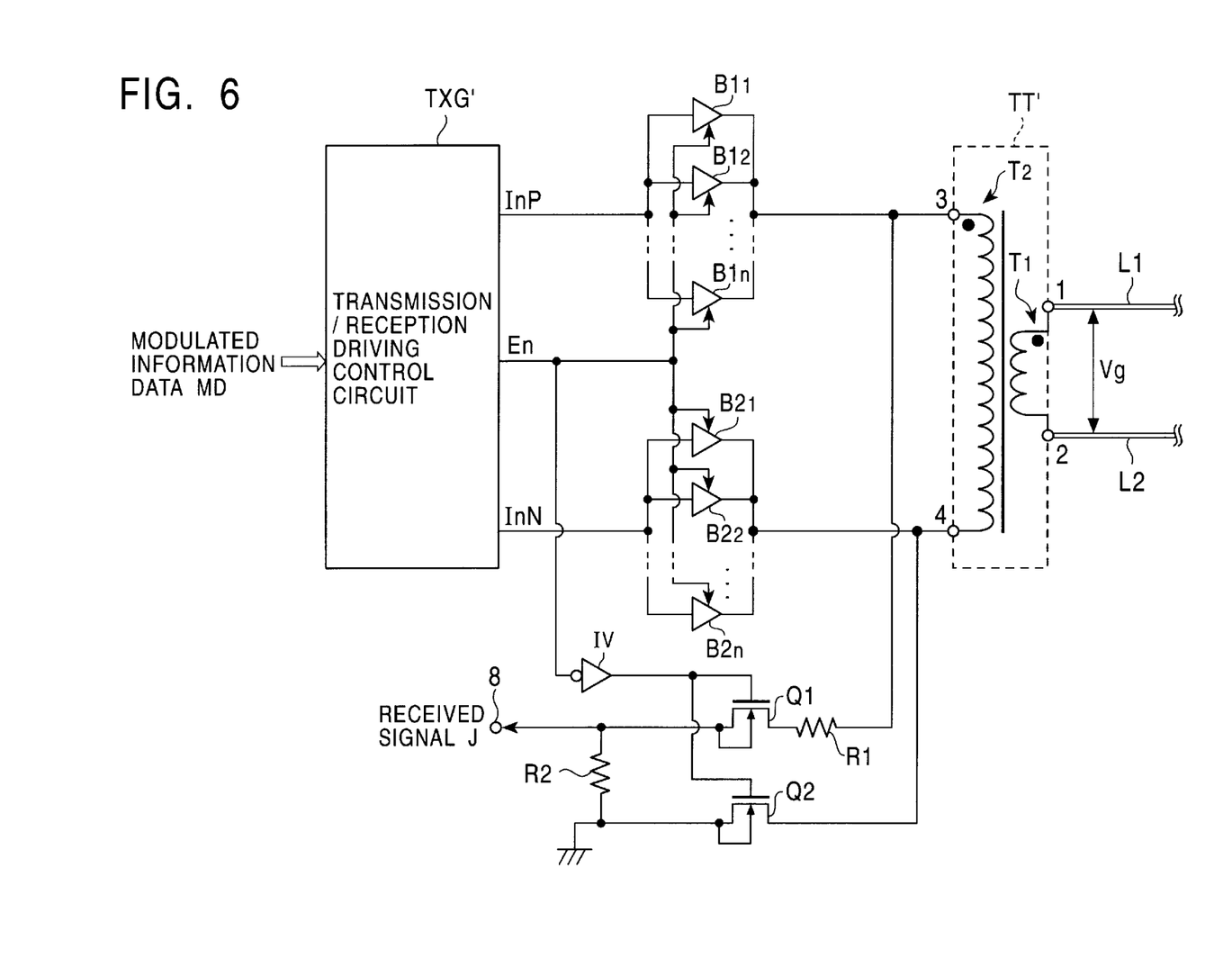
FIG. 6 is a schematic diagram illustrating the internal configuration of a transceiver circuit according to another embodiment of the present invention.

FIG. 6 is a schematic diagram illustrating a transceiver circuit according to another embodiment of the present invention which has been made in view of the above-mentioned simplification.

Referring specifically to FIG. 6, a coupling transformer TT' has a primary winding $T_1$ and a secondary winding $T_2$. The primary winding $T_1$ has terminals 1, 2 connected to balanced transmission lines L1, L2, respectively. The balanced transmission lines L1, L2 are connected to the terminal 10 which has the ISDN non-standard terminal device 11, the TA 12, and the network termination device 13 as illustrated in FIG. 1.

The secondary winding $T_2$ in the coupling transformer TT has a terminal 3 connected to output terminals of n tristate buffers $B1_1$–$B1_n$. Also, each of the tristate buffers $B1_1$–$B1_n$ is supplied at its input terminal with a first driving pulse InP from a transmission/reception driving control circuit TXG'. In other words, the tristate buffers $B1_1$–$B1_n$ have their input terminals connected to one another, and their output terminals also connected to one another. The secondary winding $T_2$ has a terminal 4 connected to output terminals of n tristate buffers $B2_1$–$B2_n$. Each of the tristate buffers $B2_1$–$B2_n$ is supplied at its input terminal with a second driving pulse signal InN from the transmission/reception driving control circuit TXG'. In other words, the tristate buffers $B2_1$–$B2_n$ have their input terminals connected to one another, and their output terminals also connected to one another. It should be noted that the number n of the connected tristate buffers B1 (or B2) is predetermined in accordance with the amount of current required to drive the balanced transmission lines L1, L2.

Each of the tristate buffers $B1_1$–$B1_n$ and $B2_1$–$B2_n$ is commonly supplied at its enable terminal with a transmission/reception control signal En from the transmission/reception driving control circuit TXG'. More specifically, each of the tristate buffers $B1_1$–$B1_n$ and $B2_1$–$B2_2$ is disabled when it is supplied at its enable terminal with the transmission/reception control signal En at logical level "0" so that each output terminal presents a high impedance state. On the other hand, each of the tristate buffers $B1_1$–$B1_n$ and $B2_1$–$B2_n$ is enabled to output when it is supplied with the transmission/reception control signal En at logical level "1," and generates a potential at its output terminal corresponding to a logical level of the first driving pulse signal InP (or InN) supplied to its input terminal (for example, a low potential with the logical level "0" and a high potential with the logical level "1"). Each of the tristate buffers $B1_1$–$B1_n$ and $B2_1$–$B2_n$ is formed in a MOS (Metal Oxide Semiconductor) structure.

The secondary winding $T_2$ in the coupling transformer TT' has the terminal 3 connected to a drain terminal of an n-channel MOS transistor Q1 through a resistor R1. The transistor Q1 has a source terminal connected to a reception terminal 8. The reception terminal 8 is grounded through a resistor R2. In this event, the serially connected resistors R1, R2 has a combined resistance which matches the characteristic impedance of a transmission line. Further, the secondary winding $T_2$ in the coupling transformer TT' has the terminal T4 connected to a drain terminal of an n-channel MOS transistor Q2. The transistor Q2 has a grounded source terminal. These transistors Q1, Q2 are supplied at their respective gate terminals with the transmission/reception control signal En after it has been inverted its logical level through an invertor IV. In other words, each of the transistors Q1, Q2 turns OFF when the transmission/reception control signal En is at logical level "1," and turns ON when the transmission/reception control signal En is at logical level "0." When the transistors Q1, Q2 each turn ON, a potential generated at the terminal 3 of the secondary winding $T_2$ for reception is output as a received signal J from the reception terminal 8. Further, the resistors R1, R2 are connected in series between the terminals 3, 4 of the secondary winding $T_2$ for reception.

The operation of the transmission/reception driving control circuit TXG' is identical to that illustrated in FIG. 5, and an interline voltage Vg generated between the balanced transmission lines L1, L2 is also identical to that illustrated in FIG. 5.

Specifically, as illustrated in FIG. 5, in the first driving interval G1, the interline voltage Vg having a positive voltage +E is generated between the terminals 1, 2 of the primary winding $T_1$ of the coupling transformer TT in response to the first driving pulse signal InP at logical level "1," the second driving pulse signal InN at logical level "0," and the transmission/reception control signal En at logical level "1," all of which are supplied from the transmission/reception driving control circuit TXG'.

In the second driving interval G2, each of the tristate buffers $B1_1$–$B1_n$ and $B2_1$–$B2_n$ is disabled in response to the first driving pulse signal InP, the second driving pulse signal InN, and the transmission/reception control signal En, all at logical level "0." Thus, the interline voltage Vg across the primary winding $T_1$ of the coupling transformer TT' becomes zero as illustrated in FIG. 5. Further, since each of the transistors Q1, Q2 turns ON, the resistors R1, R2 are connected in series between the terminals 3, 4 of the secondary winding $T_2$ of the coupling transformer TT'. In this event, since the combined resistance of the serially connected resistors R1, R2 is set at a value which matches the characteristic impedance of the transmission path, a significant reduction is accomplished in the influence due to reflection or the like.

Next, in the third driving interval G3, the interline voltage Vg having a negative voltage –E is generated between the terminals 1, 2 of the primary winding $T_1$ of the coupling transformer TT in response to the first driving pulse signal InP at logical level "0," the second driving pulse signal InN at logical level "1," and the transmission/reception control signal En at logical level "1," as illustrated in FIG. 5.

As described above, the configuration illustrated in FIG. 6 is similar to that of FIG. 1 in that it can realize a half-matching type transceiver circuit which functions as an impedance-unmatching type when it is transmitting a pulse signal having an amplitude such as the voltage +E or the voltage –E, and functions as an impedance-matching type when it is transmitting a signal having no amplitude such as the voltage 0. Advantageously, since the configuration illustrated in FIG. 6 has a simplified structure for the coupling transformer as compared with the configuration illustrated in FIG. 1, an area required to mount the transceiver circuit can be further reduced.

While the foregoing embodiments have employed the transistors Q1, Q2 of MOS structure as switching elements, elements of any structure may be employed as long as they can provide the switching operation as described above.

Also, while in the foregoing embodiments, the transceiver circuit according to the present invention has been described in connection with an ISDN-based communication system, the present invention can be applied to any communication system as long as it transmits a ternary pulse signal through two balanced transmission lines.

As described above in detail, the present invention realizes a half-matching type transceiver circuit by a configuration comprising a coupling transformer having a primary winding with one end and the other end thereof connected to the balanced transmission lines, a first tristate buffer having an output terminal thereof connected to one end of a secondary winding of the coupling transformer, a second tristate buffer having an output terminal thereof connected to the other end of the secondary winding of the coupling transformer, and a transmission/reception driving control circuit responsive to the information data to be transmitted for intermittently generating a first driving pulse signal having a predetermined high potential to supply the first driving pulse signal to an input terminal of the first tristate buffer, while intermittently generating a second driving pulse signal having the high potential at a timing different from the first driving pulse signal to supply the second driving pulse signal to an input terminal of the second tristate buffer, and further for controlling the first tristate buffer and the second tristate buffer such that the first tristate buffer and the second tristate buffer are enabled only at a timing at which the first driving pulse signal or the second driving pulse signal is generated.

In the foregoing configuration, since the tristate buffers may be implemented by those formed as cells in a MOS structure LSI, it is possible to realize a half-matching type transceiver circuit having a desired current driving capability without the need for employing relatively large discrete parts.

Thus, the transceiver circuit according to the present invention is preferred because an area required for the mounting thereof can be reduced.

What is claimed is:

1. A transceiver circuit for transmitting or receiving a ternary pulse signal carrying information data through two balanced transmission lines, comprising:
   a coupling transformer having a primary winding with one end and the other end thereof connected to said balanced transmission lines;
   a first tristate buffer having an output terminal thereof connected to one end of a secondary winding of said coupling transformer;
   a second tristate buffer having an output terminal thereof connected to the other end of said secondary winding of said coupling transformer; and
   a transmission/reception driving control circuit responsive to said information data to be transmitted for intermittently generating a first driving pulse signal having a predetermined high potential to supply said first driving pulse signal to an input terminal of said first tristate buffer, while intermittently generating a second driving pulse signal having said high potential at a timing different from said first driving pulse signal to supply said second driving pulse signal to an input terminal of said second tristate buffer, and further for controlling said first tristate buffer and said second tristate buffer such that said first tristate buffer and said second tristate buffer are enabled only at a timing at which said first driving pulse signal or said second driving pulse signal is generated.

2. A transceiver circuit according to claim 1, wherein each of said first tristate buffer and said second tristate buffer comprises a plurality of tristate buffer elements which have respective input terminals connected to one another and respective output terminals connected to one another.

3. A transceiver circuit according to claim 1, wherein:
   said coupling transformer includes a second secondary winding other than said secondary winding; and
   said transceiver circuit further comprises:
      a reception terminal for extracting said pulse signal received through said balanced transmission lines;
      a first switching element operative, only when said first tristate buffer and said second tristate buffer are both disabled, to turn ON to connect one terminal of said second secondary winding to said reception terminal;
      a second switching element adapted to turn ON to ground the other end of said second secondary winding only when said first tristate buffer and said second tristate buffer are both disabled; and
      a resistor having one end connected to said reception terminal and the other end grounded.

4. A transceiver circuit according to claim 3, wherein said resistor has a resistance which matches a characteristic impedance of said balanced transmission lines.

5. A transceiver circuit according to claim 1, further comprising:
   a reception terminal for extracting said pulse signal received through said balanced transmission lines;
   a first switching element adapted to turn ON to connect one end of said secondary winding to said reception terminal through a first resistor only when said tristate buffer and said second tristate buffer are both disabled;
   a second resistor having one end connected to said reception terminal and the other end grounded; and
   a second switching element operative, only when said first tristate buffer and said second tristate buffer are both disabled, to turn ON to ground the other end of said secondary winding.

6. A transceiver circuit according to claim 5, wherein said first resistor and said second resistor, when connected in series, has a resistance which matches a characteristic impedance of said balanced transmission lines.

* * * * *